Figure 1:
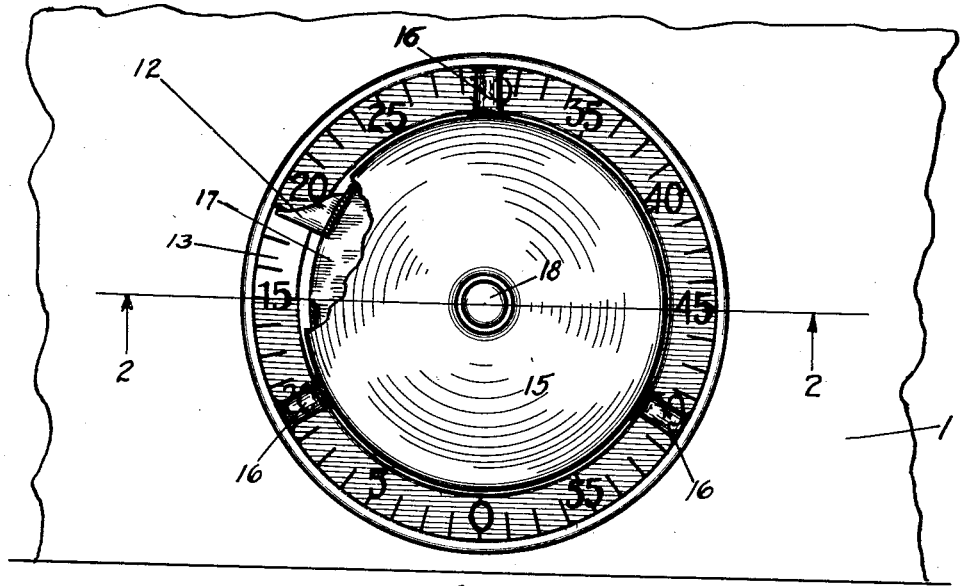

Sept. 2, 1924.

J. H. COPE 1,506,976

ILLUMINATED SPEEDOMETER

Filed Jan. 15, 1924

Inventor
Joseph H. Cope
By A. J. O'Brien
Attorney

Patented Sept. 2, 1924.

1,506,976

UNITED STATES PATENT OFFICE.

JOSEPH H. COPE, OF DENVER, COLORADO, ASSIGNOR OF ONE-HALF TO GEORGE F. KERN, OF WINDSOR, COLORADO.

ILLUMINATED SPEEDOMETER.

Application filed January 15, 1924. Serial No. 686,451.

*To all whom it may concern:*

Be it known that I, JOSEPH H. COPE, citizen of the United States, residing at Denver, the city and county of Denver, and State of Colorado, have invented certain new and useful Improvements in Illuminated Speedometers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to speed indicating devices and has reference specifically to improvements in the manner of illuminating the dial so that the readings can be more readily made after dark.

The ordinary speedometer employed in connection with automobiles depends for its illumination on the lamp placed on the instrument board. This is not entirely satisfactory for the reason that it requires quite accurate focusing of the eyes to enable the observer to correctly observe the indications.

It is the object of this invention to produce a speed indicating device which shall be so constructed and which shall be illuminated in such a manner that an observer can readily determine with sufficient accuracy the value of the indication without the necessity of the eyes becoming sharply focused. It is well known that in driving an automobile at high or even at moderate speed, the driver cannot take his eyes from the road for more than an instant without incurring risks. Where the usual arrangement of speedometer illumination is employed, it is almost impossible to determine the correct reading at night, due mostly to the fact that the eyes have not sufficient time to change their focus.

My invention briefly described consists in substituting for the usual pointer a light aluminum disk with upstanding flanges. This disk rotates through a given angle for any given increase in speed, and has attached to the outside a short pointer which moves over a circular scale. A short section of the flange is cut away near the pointer. A convex cover lies over the rotatable disk and has its edge extending downwardly over the flange of the disk. An incandescent lamp is secured to the convex cover and it is so located that light from it will pass out through the gap in the flange and illuminate a short section of the scale which then becomes clearly visible, and by the position of which the speed can be quite accurately determined even when the divisions on the scale are not clearly distinguished. An upstanding annular, inwardly concave ring surrounds the scale and prevents the light from becoming projected beyond the outer circumference of the scale.

Figure 2:
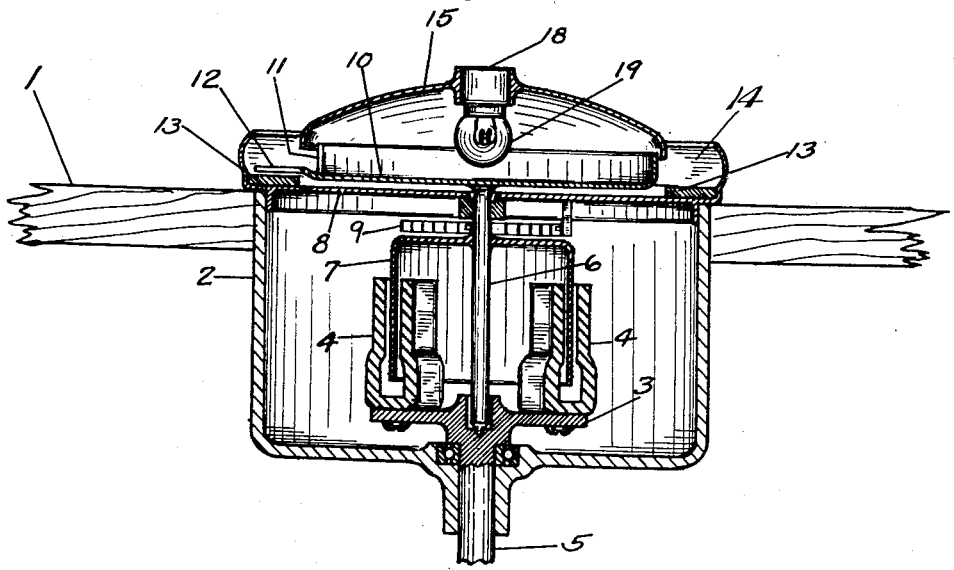

In order better and more clearly to describe my invention, I shall have reference to the accompanying drawing in which the preferred embodiment of my invention is shown and in which:

Fig. 1 is an elevational view showing the appearance of the face of my improved speedometer when illuminated, and Fig. 2 is a section taken on line 2—2, Fig. 1.

The same reference numbers will be used to designate the same parts throughout the several views.

Numeral 1 designates the instrument board of an automobile which is perforated for the reception of the speedometer casing, 2. Within this casing is a speed responsive mechanism of any desired type but which for the purpose of illustration has been shown as consisting of a disk, 3, to which are secured U-shaped permanent electromagnets, 4. The disk, 3, has a spindle, 5, which is connected by means of a flexible shaft (not shown) to one of the front wheels in the usual manner. A spindle, 6, is mounted with its axis coinciding with the axis of the spindle 5 and carries an aluminum cup, 7, whose side projects between the legs of the magnets, 4, but does not touch the same. The spindle 6 has a bearing in the top cover, member 8, and is acted upon by a spring, 9, which tends to move the pointer to zero against the force due to the Eddy currents in the side of the cup, 7, all in the manner old and well understood. My invention is as well adapted to be employed in connection with a centrifugal operating mechanism as with the one shown, and will now be described.

Instead of having an ordinary hand or pointer secured to the outer end of the spindle, 6, I secure thereto a flat disk whose edges, 11, are bent at right angles thereto. A pointer 12, is secured to the disk, 10, and cooperates with the annular scale, 13, for the purpose of indicating the speed during the day time. Surrounding the scale, 13, is a reflector, 14, whose purpose will be apparent as the description proceeds. An inverted saucer-shaped member, 15, is secured to the reflector, 14, by means of supporting arms, 16. The edge of member 15 extends down below the upper edge of flange 11 in the manner shown in Fig. 3. A gap, 17, is provided in the flange, 11, at a point near the pointer, 12, for a purpose that will hereinafter appear. Centrally of member 15, I place a socket, 18. An incandescent lamp, 19, is secured in the socket and is connected to the lighting circuit of the automobile by means of wires and switches which have not been shown.

When the lamp, 19, is lit, light will emerge through the gap, 17, and illuminate a segment of the scale somewhat as shown in Fig. 1. The light rays will be prevented from passing beyond the scale by action of the reflector, 14. As the disk, 10, is rotated by means of the spindle through an angle which is proportional to the speed at which the car is traveling, the pointer and the gap will occupy a position with relation to the scale which indicates the speed. At night when the lamp, 19, is lit, the luminous segment of the scale will be clearly visible and its position on the scale can be observed at a glance. The driver, due to his familiarity with the scale, is enabled to estimate the speed within narrow limits by merely glancing on the scale and observing the relative position of the illuminated portion thereof.

A speedometer constructed as above described is also well adapted to be attached to the rear of a car for the purpose of making the speed visible to the traffic police and others.

I am aware that speedometers have heretofore been provided with lamps located within the structure and adapted to illuminate the dials, but as far as I am aware no one has heretofore provided a speedometer with means that illuminates a segment of the dial only so that the point of illumination serves as a pointer.

The gap, 17, can be made of any angular extent up to 180 degrees, if desired, without departing from the spirit of the invention.

Having now described my invention, what I claim is:

1. A speed-indicating device comprising, in combination, a stationary annular scale, a dishlike member mounted so as to rotate about an axis concentric with said scale, said member having its outer edge bent upwardly so as to form a flange, said flange being provided with an opening, a cover over said dishlike member, a lamp located in the chamber formed by the dishlike member and the cover, and speed-responsive means for rotating said member whereby a beam of light will pass through the opening and illuminate a portion of the scale.

2. A speed-indicating device comprising, in combination, a stationary annular scale, a dishlike member mounted so as to rotate about an axis concentric with said scale, said member having its outer edge bent upwardly so as to form a flange, said flange being provided with an opening, a cover over said dishlike member, a lamp located in the chamber formed by the dishlike member and the cover, speed-responsive means for rotating said member whereby a beam of light will pass through the opening and illuminate a portion of the scale, and a circular reflector surrounding said scale, said reflector being adapted to intercept the light that passes through the opening.

3. A speed indicator comprising a flat annular scale, a reflector surrounding the scale and projecting upwardly therefrom, a speed-responsive device, a circular disk operatively connected to the speed-responsive device and adapted to be rotated through an arc which is proportioned to the speed, said disk having a flange extending upwardly from the outer edge thereof, said flange having an opening, a cover for said disk and a lamp located in the space between the disk and the cover.

In testimony whereof I affix my signature.

JOSEPH H. COPE.